(12) United States Patent
Toda et al.

(10) Patent No.: US 7,819,424 B2
(45) Date of Patent: Oct. 26, 2010

(54) SIDE-COLLISION AIRBAG APPARATUS

(75) Inventors: Tadataka Toda, Tokyo (JP); Liang Yin, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/314,127

(22) Filed: Dec. 4, 2008

(65) Prior Publication Data

US 2009/0212542 A1 Aug. 27, 2009

(30) Foreign Application Priority Data

Feb. 22, 2008 (JP) .............................. 2008-041609

(51) Int. Cl.
*B60R 21/207* (2006.01)
*B60R 21/26* (2006.01)

(52) U.S. Cl. .................................. 280/730.2; 280/740
(58) Field of Classification Search ................ 280/729, 280/730.2, 740, 742
See application file for complete search history.

(56) References Cited

U.S. PATENT DOCUMENTS

| | | | | |
|---|---|---|---|---|
| 5,913,536 A * | 6/1999 | Brown | ...................... | 280/730.2 |
| 6,962,364 B2 * | 11/2005 | Ju et al. | ...................... | 280/730.2 |
| 7,597,351 B2 * | 10/2009 | Kashiwagi | ............... | 280/730.2 |
| 7,614,650 B2 * | 11/2009 | Yokota | ...................... | 280/730.2 |
| 7,644,950 B2 * | 1/2010 | Kloss et al. | ................... | 280/740 |
| 7,661,699 B2 * | 2/2010 | Buhrlen et al. | ............... | 280/729 |
| 2003/0160433 A1 * | 8/2003 | Kumagai et al. | ............ | 280/729 |
| 2003/0168836 A1 * | 9/2003 | Sato et al. | ................. | 280/730.2 |
| 2004/0124615 A1 | 7/2004 | Tanase et al. | | |
| 2004/0130127 A1 * | 7/2004 | Kurimoto et al. | ............ | 280/729 |
| 2005/0062266 A1 * | 3/2005 | Steimke et al. | ............ | 280/730.2 |
| 2005/0116446 A1 * | 6/2005 | Mabuchi et al. | .......... | 280/728.2 |
| 2005/0189742 A1 * | 9/2005 | Kumagai et al. | .......... | 280/730.2 |
| 2007/0200327 A1 * | 8/2007 | Kloss et al. | ................. | 280/740 |
| 2007/0228701 A1 * | 10/2007 | Yamamura | ............... | 280/730.2 |
| 2007/0267854 A1 * | 11/2007 | Fukuda et al. | ............ | 280/730.2 |
| 2007/0284859 A1 * | 12/2007 | Kashiwagi | ............... | 280/730.2 |
| 2007/0284862 A1 * | 12/2007 | Kashiwagi | ................... | 280/740 |

FOREIGN PATENT DOCUMENTS

| JP | 2005-225351 | * | 8/2005 |
|---|---|---|---|
| JP | 3835451 | | 10/2006 |
| JP | 3926659 | | 6/2007 |
| JP | 2007-276522 | | 10/2007 |

* cited by examiner

*Primary Examiner*—Faye M. Fleming
*Assistant Examiner*—Joseph Rocca
(74) *Attorney, Agent, or Firm*—Foley & Lardner LLP (57) ABSTRACT

An apparatus includes an airbag having first and second portions formed by seaming silicon coated cloths where the second portion has a vent. The airbag is folded in a seatback, deploys to a side of an occupant by a gas supply, and receives an occupant lumbar at the first portion and a chest at the second portion. An inflator extends across the first and second portions towards a rear of the vehicle and includes a gas injector in the first portion. A gas distributing member has a discharge port opening into the first portion and a passage opening into the second portion between the distributing member and a surface of the inflator. The distributing member is fitted to the surface and distributes gas from the inflator to the airbag so the flow rate is higher in the first portion. A communicating portion transfers gas between the first and second portions.

18 Claims, 6 Drawing Sheets

SIDE-COLLISION AIRBAG APPARATUS

BACKGROUND

The present disclosure relates to a side-collision airbag apparatus for restraining an occupant when a vehicle such as a motor vehicle encounters a side-collision or the like.

A side-collision airbag apparatus generally restrains a vehicle occupant's body by expanding a side-collision airbag at a side of the occupant using an inflator in the event of a side-collision or rolling of the vehicle (e.g., a motor vehicle). The side-collision airbag apparatus is typically mounted in a seatback portion of a seat, for example. The side-collision airbag expands and deploys from the seatback portion in a space between the occupant and a side wall portion of the vehicle body by gas injected from the inflator in the event of a side-collision or the like. The side-collision airbag may adjust the pressure of the airbag during expansion and deployment and may control the behavior of deployment by adjusting a gas flow from the inflator.

SUMMARY

One embodiment of the disclosure relates to a side-collision airbag apparatus that includes a side-collision airbag. The side-collision airbag includes a first bag portion and a second bag portion adjacent to the first bag portion. The first and second bag portions are formed by seaming two base cloths coated with silicon and where the second bag portion has a vent hole. The side-collision airbag is stored in a folded state in the interior of a seatback portion of a vehicle seat. The side-collision airbag is deployed to a side of an occupant on the seat by a supply of gas. The deployed airbag receives a lumbar part of the occupant at the first bag portion and receiving a chest part of the occupant at the second bag portion. The side-collision airbag apparatus also includes a cylindrical inflator extending across the first bag portion and the second bag portion at a position between the side-collision airbag and the rear of the vehicle. The inflator includes a gas injecting portion located in the first bag portion at a distal end of the inflator. The side-collision airbag apparatus also includes a cylindrical gas distributing member having a gas discharge port that opens into the first bag portion at a distal end of the gas distributing member and a gas passage that opens into the second bag portion and is formed between the gas distributing member and a peripheral surface of the inflator. The gas distributing member is fitted to the peripheral surface and configured to distribute and supply the gas injected from the inflator to the first bag portion and the second bag portion so the flow rate of the gas is higher in the first bag portion than in the second bag portion. The side-impact airbag apparatus also includes a communicating portion for communicating gas between the first bag portion and the second bag portion.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 1(a) and (b) are side schematic views of a motor vehicle seat including a side-collision airbag apparatus in normal and deployed states according to an exemplary embodiment.

DETAILED DESCRIPTION

According to one exemplary embodiment, a side-collision airbag apparatus includes a gas flow adjustment mechanism as disclosed in Japanese Patent No. 3835451, which is herein incorporated by reference in its entirety. The gas flow adjuster includes a partitioning or joining portion that is formed by seaming base cloths in an interior of the airbag to define a first bag portion and a second bag portion segmented by the partitioning portion. The gas flow adjuster also includes a front passage and a rear passage for communicating the first bag portion and the second bag portion. The partitioning portion also controls the gas flow injected from the inflator to make the pressure in the first bag portion for receiving the lumbar part of the occupant higher than the pressure in the second bag portion for receiving the chest part.

According to various exemplary embodiments, an impact energy absorption of a side-collision airbag can be adjusted by enabling distribution and supply of gas from an inflator to first and second bag portions in such a manner that the amount of the gas in the first bag portion becomes larger and releases an adequate amount of gas to the second bag portion when the pressure in the first bag portion is excessively increased.

According to an exemplary embodiment, a side-collision airbag apparatus injects gas from the inflator into the first bag portion to cause the first bag portion to be expanded and deployed before the second bag portion. Then the second bag portion is expanded and deployed resulting in a higher gas pressure in the first bag portion. A front passage and a rear passage (having a smaller cross-section) on an upper side of the airbag squeezes or transfers the gas flow from the first bag portion to the second bag portion to prevent the gas pressure in the first bag portion from lowering, According to an exemplary embodiment, the pressure of an airbag portion for receiving the lumbar part of the occupant is higher than an airbag portion for receiving the chest part of the occupant. A technology is used to expand and deploy the entire part of the airbag quickly and absorb an impact energy of an occupant when colliding with the airbag.

According to various exemplary embodiments, a side-collision airbag apparatus may be capable of adjusting an absorbed impact energy of a side-collision airbag to an adequate level by distributing and supplying gas injected from an inflator to a first bag portion and a second bag portion. The flow rate of the gas distributed and supplied in the first bag portion is increased to increase the pressure in the first bag portion. An adequate amount of gas is released from the first bag portion to the second bag portion when the pressure in the first bag portion is sufficiently increased so that the gas in the first bag portion is not excessively increased.

According to various exemplary embodiments, a side-collision airbag includes a first bag portion and a second bag portion adjacent to the first bag portion and formed by seaming two base cloths coated with silicon. The second bag portion has a vent hole and the side-collision airbag is stored in the interior of a seatback portion of a vehicle seat in a folded state. The airbag is deployed to the side of an occupant seated on the seat by a supply of gas to receive the lumbar part of the occupant at the first bag portion and the chest part of the occupant at the second bag portion. A cylindrical inflator extends across the first bag portion and the second bag portion at a position a little to the rear of the vehicle in the airbag and includes a gas injecting portion at the distal end of the inflator and located in the first bag portion. A gas distributing member is a cylindrical member having a gas discharging port opening into the first bag portion at the distal end of the distributing member. The distributing member also includes a gas passage opening into the second bag portion that is formed between the distributing member and a peripheral surface of the inflator. The gas passage is fitted in the airbag with a gap between the distributing member and the peripheral surface. The gas distributing member distributes and supplies the gas injected from the inflator to the first bag portion and the second bag portion so the flow rate of the gas is higher in the first bag portion. A communicating portion is used for communicating or transferring the gas between the first bag portion and the second bag portion.

According to an exemplary embodiment, the cylindrical member may be on the inflator and the gas discharging port may be at the distal end of the cylindrical member. The cylindrical member may be installed with the gap with respect to the inflator so that the gas passage opening into the second bag portion is formed between the cylindrical member and the inflator. The gas distributing member of the inflator is configured so that the gas injected from the inflator is distributed and supplied to the first bag portion and the second bag portion while easily adjusting the flow rate of the gas to be higher in the first bag portion. The pressure is higher in the first bag portion because at least one of cross-sectional areas of the gas discharging port and the gas passage is adjusted. The communicating portion allows an adequate amount of gas to be released from the first bag portion to the second bag portion to adjust an impact energy absorption of the side-collision airbag to an adequate level when the pressure in the first bag portion is sufficiently increased or when the pressure in the first bag portion is excessively increased due to an impact at the first bag portion caused by the side-collision of the vehicle.

According to another exemplary embodiment, a boundary between the first bag portion and the second bag portion formed by seaming the first and second bag portions may include a linear boundary extending in a vertical direction. The communicating portion is formed at the linear boundary by providing an unseamed portion at a portion of the linear boundary. When the pressure in the first bag portion is sufficiently increased or is excessively increased, an adequate amount of gas is released from the first bag portion to the second bag portion to adequately adjust the impact energy absorption of the side-collision airbag.

According to another exemplary embodiment, the gas distributing member may include an irregular cylinder-shaped heat cloth. A portion of the heat cloth extends at a right angle with respect to the direction of injection of the gas from the inflator to the first bag portion and reaches the linear boundary. The heat cloth or heat shield reduces the amount of deterioration of the first bag portion caused by the gas injected from the inflator. To efficiently filled the first bag portion with gas, the communicating portion is nearly closed off by the heat cloth in an initial stage of expansion and deployment of the side-collision airbag so that the gas is prevented from being released from the communicating portion in the initial stage.

According to another exemplary embodiment, a non-expanding portion may be formed on the gas distributing member at a position nearer the front of the vehicle by seaming the periphery of the airbag so that the communication between the first bag portion and the second bag portion is blocked. The communicating portion is formed at the non-expanding portion of the boundary at a portion nearer the front of the vehicle by providing an unseamed portion at the non-expanding portion. When the pressure in the first bag portion is sufficiently increased or is excessively increased, an adequate amount of gas can be released from the first bag portion to the second bag portion to adjust the impact energy absorption of the side-collision airbag.

According to another exemplary embodiment, a non-expanding portion may be formed on the gas distributing member at a position nearer the front of the vehicle by seaming the periphery of the airbag so that the communication between the first bag portion and the second bag portion is blocked. The communicating portion is formed between the non-expanding portion and the gas distributing member by providing the non-expanding portion at a position apart from the gas distributing member nearer the front of the vehicle. When the pressure in the first bag portion is sufficiently increased or is excessively increased, an adequate amount of gas is released from the first bag portion to the second bag portion to adjust the impact energy absorption of the side-collision airbag.

According to various exemplary embodiments, the impact energy absorption of a side-collision airbag can be adjusted to a desired level by distributing and supplying gas injected from an inflator of the airbag to a first bag portion and a second bag portion. The flow rate of the gas distributed and supplied in the first bag portion may be increased to increase the pressure in the first bag portion. An adequate amount of gas from the first bag portion may be released to the second bag portion when the pressure in the first bag portion is sufficiently increased or is increased excessively.

Referring now to the drawings, various exemplary embodiments are described. An inflator 20 in a side-collision airbag 16 is arranged across first and second bag portions 16A and 16B, and a sleeve 40 is fitted on the inflator with the intermediary of a gap. The sleeve includes a gas discharging port opening into the first bag portion at the distal end of the sleeve and is formed with a gas passage opening into the second bag portion between the sleeve and the inflator to configure a gas distributing member from the inflator to the first and second bag portions. An unseamed portion is provided on a part of a vertical linear boundary 24a1 formed by an inner seam 24a where the first and second bag portions come into linearly contact with each other to form a communicating portion 80 for communicating the first and second bag portions.

Figure 1:
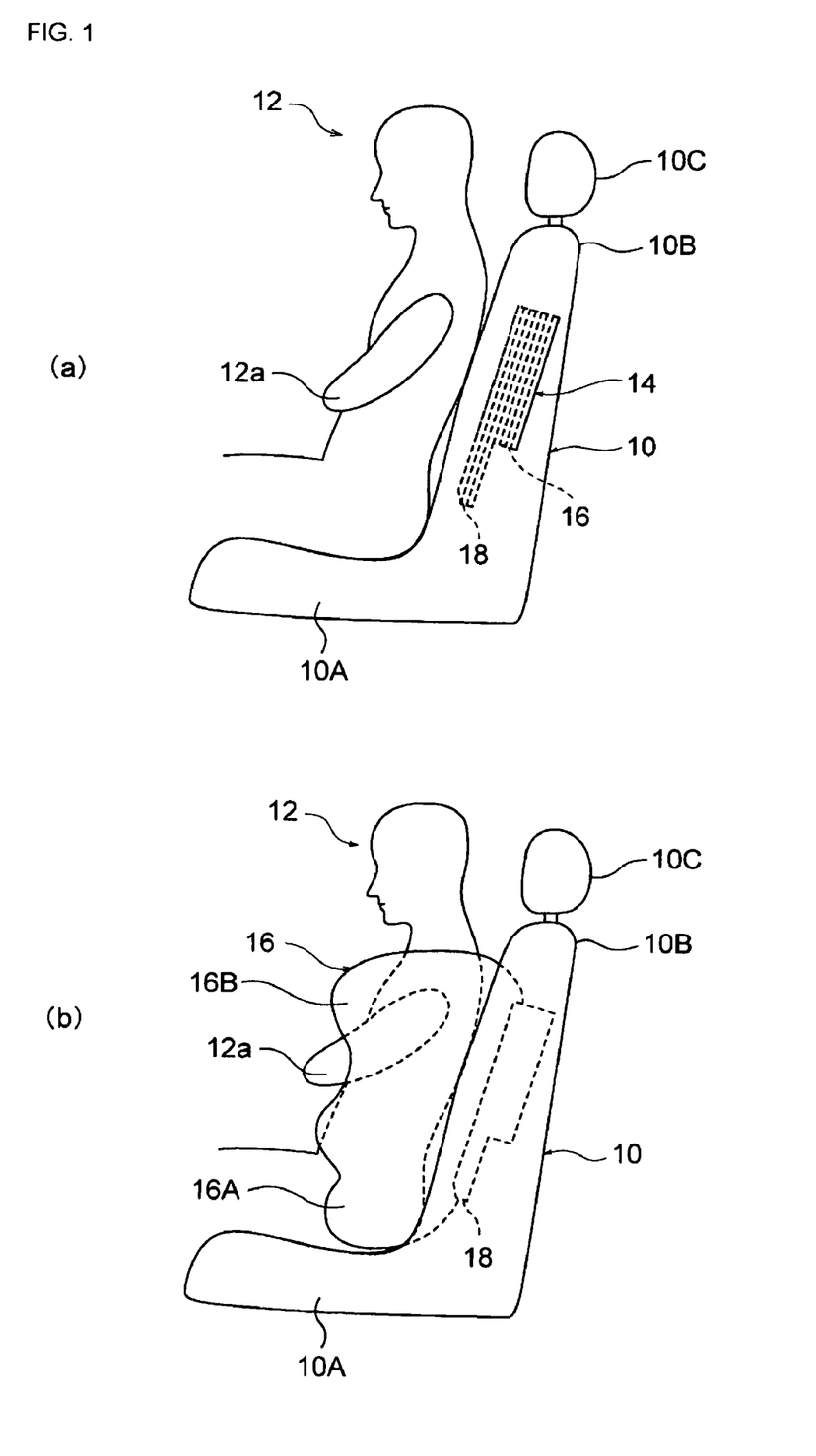

FIG. 1 is a side schematic view of a seat for a motor vehicle including a side-collision airbag apparatus according to an exemplary embodiment. FIG. 1(a) shows an airbag in a normal state and FIG. 1(b) shows the airbag in a deployed state.

Referring to FIG. 1, a seat 10 of the motor vehicle includes a seating portion 10A on which an occupant 12 may be seated and a seatback portion 100B projecting upward from a rear portion of the seating portion 10A for the occupant 12 to lean on. A headrest 10C for the occupant 12 to lean and rest a head portion on is mounted on the top of the seatback portion 10B.

A side-collision airbag apparatus 14 is located in the seatback portion 10B of the seat 10. The side-collision airbag apparatus 14 is configured to control the movement of the occupant 12 in the event of a side-collision or rolling of the vehicle or the like due to an accident.

The side-collision airbag apparatus 14 includes a side-collision airbag 16 that is expanded and deployed on the side of the occupant 12. The apparatus 14 also includes a plastic or resin casing 18, for example, in which the airbag 16 is stored in a folded state and an inflator 20 (see details in FIG. 3 and thereafter) for supplying gas for expanding and deploying the airbag 16. The inflator 20 may be connected to an inflator ignition control circuit that is not shown. The side-collision airbag 16 includes a first bag portion 16A positioned on a lower side of the airbag 16 and a second bag portion 16B positioned on an upper side of the airbag 16 (see FIG. 2).

The side-collision airbag 16 is stored in the seatback portion 10B of the seat 10 in a folded state in the casing 18 before deployment as shown in FIG. 1(a). When the motor vehicle encounters a side-collision, for example, the inflator 20 is ignited by the ignition control circuit and gas is generated and supplied to the airbag 16. As shown in FIG. 1(b), the airbag 16 is expanded and breaks a seamed line (not shown) between a cloth on a front surface and a cloth on a side surface of the seatback portion 10B and is deployed on the side of the occupant 12. When used herein, the term seam includes connecting the airbag fabrics together using conventional means, such as, for example stitching, weaving, adhesive, sealant, etc. The first bag portion 16A on the lower side of the airbag 16 receives and controls the movement of a lumbar part of the occupant 12 while absorbing an impact to the lumbar part. The second bag portion 16B on the upper side receives a chest part of the occupant 12 to absorb an impact to the chest part.

Figure 2:
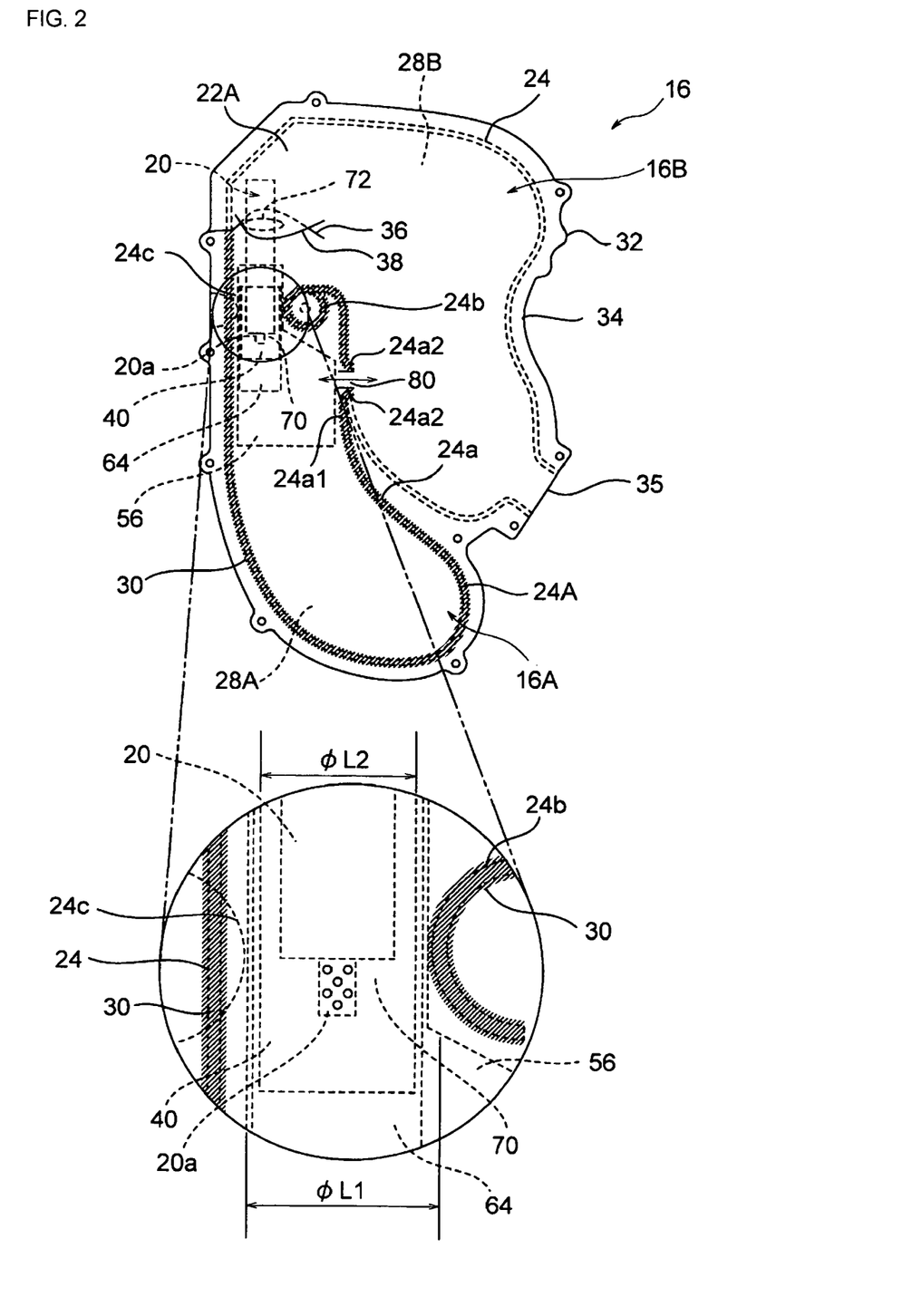
FIG. 2 is a front view of an expanded and deployed airbag of the side-collision airbag apparatus shown in FIG. 1 according to an exemplary embodiment.

FIG. 2 is a front view showing an expanded and deployed airbag of the side-collision airbag apparatus. The side-collision airbag 16 is formed into a bag member. The interior of the bag member is segmented into two chambers by superimposing a first panel 22A (arranged on the side of the occupant) and a second panel (arranged on the side of a side wall portion of a vehicle body). The second panel (not shown) is formed into substantially the same shape as the first panel 22A. The first panel 22A and the second panel are placed one on top of another and the outer edges are seamed together. The airbag 16 is configured into a bag member structure including the first bag portion 16A having a first chamber 28A formed from a proximal side (left side in FIG. 2) to a lower side in the direction of expansion at a position a little to the rear of the vehicle where the inflator 20 is arranged. The bag member structure also includes a second bag portion 16B having a second chamber 28B that is formed from an upper side of the proximal side in the direction of expansion of the inflator 20 to the distal end side in the direction of expansion (right side in FIG. 2) at a position nearer the front of the vehicle.

A seam 24 is a portion along the outer edge portion of the airbag 16 and is a portion in an inside portion toward the proximal portion of the airbag 16 in the direction of expansion. The seam 24 segments the first bag portion 16A and the second bag portion 16B (the inner seam is designated by reference numeral 24a) using double seams (that is, in two rows). However, according to other exemplary embodiments, the seam 24 may be a single seam.

The second bag portion 16B includes a vent hole 35 for alleviating the pressure in the second bag portion 16B. The vent hole 35 is an unseamed portion of a base cloth at a lower portion of a bag peripheral portion 32 on a distal side of the second bag portion 16B in the direction of expansion (right side in FIG. 2). The second bag portion 16B is formed with a recess 34 having a substantially arcuate shape at the bag peripheral portion 32 corresponding to an elbow portion 12a of the occupant 12 (see FIG. 1) above the vent hole 35. Recesses are formed of the same shape as the elbow portion on the first and second panels 22A, 22B.

The inner seam 24a, which segments the first bag portion 16A and the second bag portion 16B, is not at a proximal portion of the airbag 16 in the direction of expansion (left side in FIG. 2). A fitting portion 70 for allowing the passage of the inflator 20 or the like is formed inside the proximal portion. The fitting portion 70 is inside the airbag 16 between opposed apexes of a circular seam (non-expanding portion) 24b (right side in FIG. 2) and a semi-circular seam 24c (left side in FIG. 2). The circular seam 24b is generally continuous from the distal end portion of the inner seam 24a toward the proximal portion of the airbag 16 (in the direction of expansion) by seaming the periphery in a substantially circular shape. The semi-circular seam 24c (left side in FIG. 2) is at the proximal portion of the airbag 16 in the direction of expansion toward the circular seam 24b and is seamed in a substantially semi-circular shape as shown in the partially enlarged view of FIG. 2.

The inflator 20 is arranged across the first bag portion 16A and the second bag portion 16B through the fitting portion 70 in a vertical direction in the airbag 16. A gas injecting portion 20a at the distal end of the inflator 20 is positioned inside the first bag portion 16A. A sleeve 40 is fitted around the inflator 20. The sleeve 40 is covered with a diffuser cloth 64 and with a heat cloth 56 on the outer side of the diffuser cloth 64. The sleeve 40, the diffuser cloth 64, and the heat cloth 56 extend from the fitting portion 70 inward to the first bag portion 16A.

The apex of the semi-circular seam 24c on the side of the fitting portion 70 is positioned inside (right side, the side of the fitting portion 70 in FIG. 2) beyond a seal member 30 (described later). By controlling the position of the apex of the semi-circular seam 24c, an inner diameter L1 of the fitting portion 70 may be slightly larger than an outer diameter L2 of the sleeve 40 (see the partial enlarged view in FIG. 2). Consequently, the sleeve 40 (including the diffuser cloth 64 and the heat cloth 56) is mounted by being tightly fastened by the fitting portion 70 to generate an airtight seal between the sleeve 40 and the fitting portion 70.

The inner diameters of the circular seam 24b and the semi-circular seam 24c at the apexes of the circular seam 24b are set to be slightly larger than the outer diameter of the sleeve 40 by the circular and semi-circular seams 24b, 24c on both sides (or, may be on one side only) of the fitting portion 70. Accordingly, friction occurring at the time of fitting the sleeve 40 may be reduced and mounting the sleeve 40 to the fitting portion may be improved in comparison with forming a fitting portion having an inner diameter slightly larger than the outer diameter of the sleeve 40 by seaming both sides of the fitting portion in a linear shape and fitting the sleeve 40 to the fitting portion.

The sleeve 40 covered on the inflator 20 can distribute the flow rate of the gas injected from the gas injecting portion 20a to the first bag portion 16A (the first chamber 28A) and the second bag portion 16B (second chamber 28B) at a predetermined ratio (described in detail later).

The seal member 30 is formed of silicon rubber or the like and is located along a seamed portion 24A of the outer edge of the first bag portion 16A of the seam 24 (the inner seam 24a, and the non-expanding portion 24b which continues therefrom) for sealing the seamed portion 24A. The seal member 30 is wider than the double seam to allow sealing of both seams of the double seam at the seamed portion 24A. Accordingly, the airtight seal of the first bag portion 16A may be improved and the pressure in the first bag portion 16A that receives the lumbar part of the occupant 12 can be maintained at a high pressure for a long period of time.

The first panel 22A defines a slit (insertion port) 72 for inserting the inflator 20 and the sleeve 40 into the side-collision airbag 16. The first panel 22A also includes a covering member 36 (a first covering member) for covering the slit 72 from a lower side and a covering member 38 (second covering member) for covering the slit 72 on an upper side. The covering members 36, 38 are configured with part of a lining cloth that is integral to the surface of the first panel 22A by seaming. The inflator 20 and the sleeve 40 are inserted into the second bag portion 16B via the slit 72. The slit 72 is covered with the covering members 36, 38 to produce an airtight seal in the side-collision airbag 16.

Figure 3:
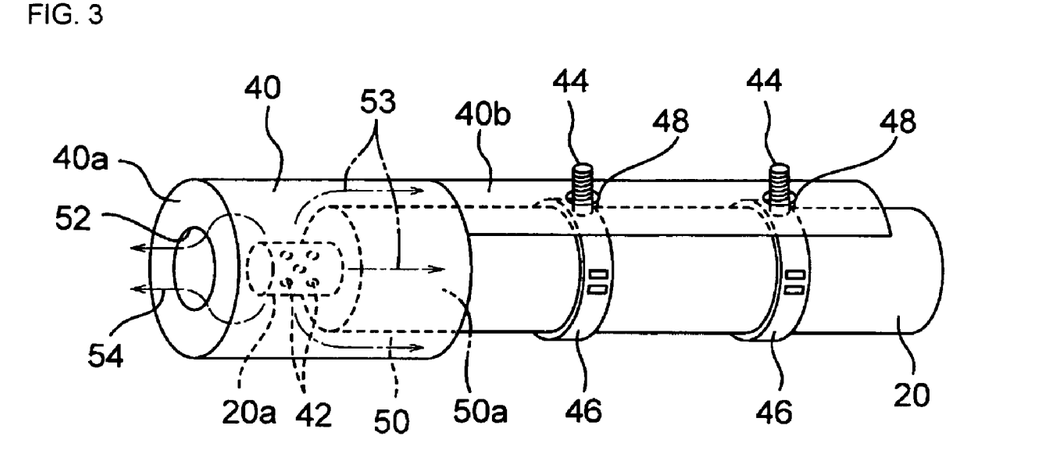
FIG. 3 is a perspective view of an inflator including a sleeve and provided on the airbag shown in FIG. 1 according to an exemplary embodiment.

FIG. 3 is a perspective view of the inflator including the sleeve described above. The inflator 20 is shown placed horizontally, however, the inflator 20 can be in the vertical direction in the airbag 16 as described in conjunction with FIG. 2.

As shown in FIG. 3, the inflator 20 is a substantially circular cylindrical member having a gas injecting portion 20a positioned in the first bag portion 16A at the distal end (left side in FIG. 3). The gas injecting portion 20a is formed into the shape of a projection and a plurality of gas injecting holes 42 are formed around the projection. Supporting clips 46 for supporting the inflator 20 are fitted onto the body of the inflator 20. Each of the supporting clips 46 include a bolt 44 extending upright for mounting to the casing 18 in FIG. 1. The sleeve 40 is a cylindrical member having a narrow portion 40a having a gas discharging port 52 on the distal side (the left side in FIG. 3, the side of the first chamber 28A). The sleeve 40 has a length that covers from the front of the gas injecting portion 20a of the inflator 20 to the general midsection of the inflator 20. The rear end of the sleeve 40 is positioned in the interior of the second chamber 28B. The rear end of the sleeve 40 includes a mounting frame 40b so it can project toward the rear portion of the inflator 20. The mounting frame 40b defines a hole 48.

Figure 4:
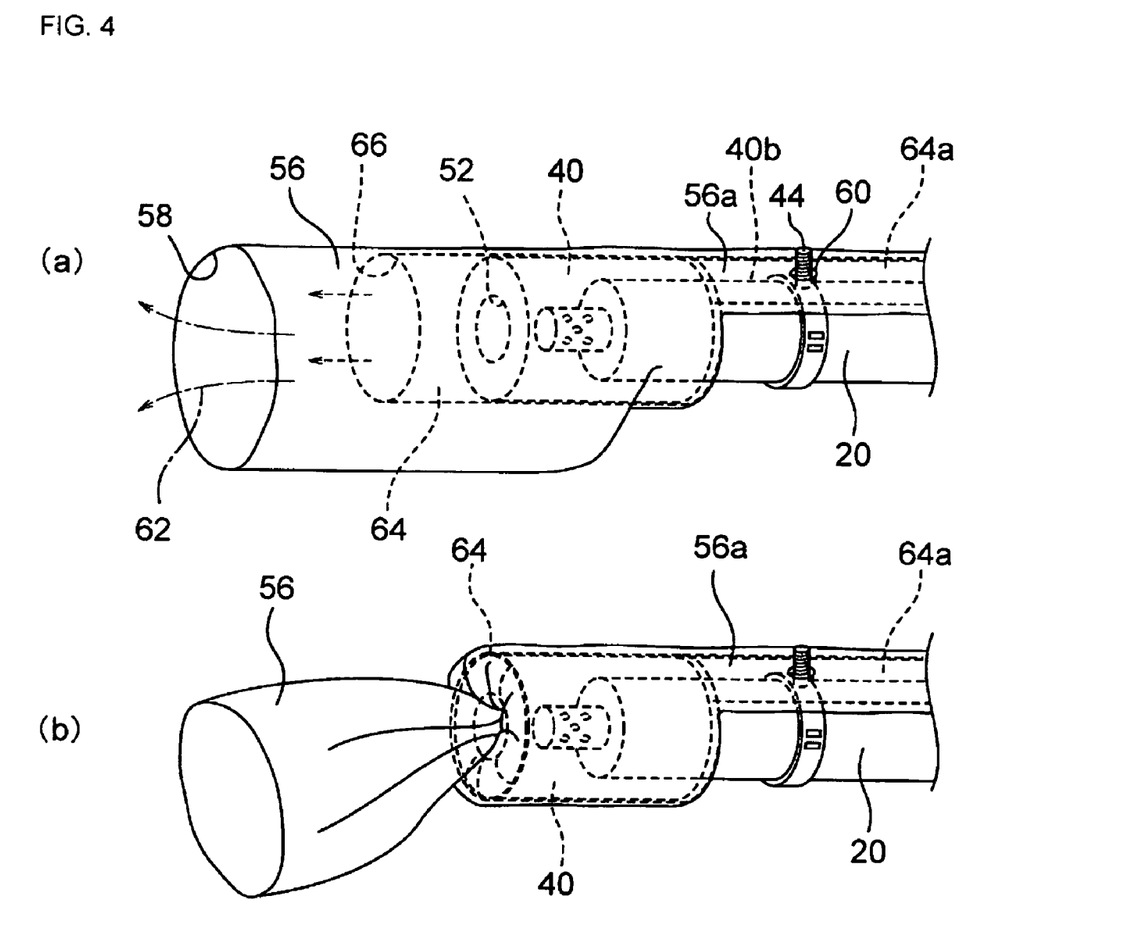
FIG. 4 is a perspective view showing behaviors of a diffuser cloth and a heat cloth mounted on the sleeve of the inflator according to an exemplary embodiment.

The sleeve 40 covers the inflator 20 from a side of the gas injecting portion 20a. A mounting frame 40b is superimposed on a rear portion of the inflator 20. As shown in FIG. 4, the diffuser cloth 64 and the heat cloth 56 are covered on the sleeve 40 from a side of the narrow portion 40a and then a mounting portion 64a of the diffuser cloth 64 and a mounting portion 56a of the heat cloth 56 are superimposed on the mounting frame 40b of the sleeve 40. The bolts 44 from the supporting clips 46 are inserted into the holes 48 of the mounting frame 40b of the sleeve 40, holes of the mounting portion 64a of the diffuser cloth 64 (not shown), and holes 60 of the mounting portion 56a of the heat cloth 56. By screwing the bolts 44 to the casing 18, the inflator 20 is fixed to the casing 18 with the sleeve 40, the diffuser cloth 64, and the heat cloth 56 and the side-collision airbag 16 is mounted to the casing 18.

The inner diameter of the sleeve 40 is larger than the outer diameter of the inflator 20 and the sleeve 40 fitted onto the inflator 20 defines a gas passage 50 opening into the second chamber 28B between itself and the peripheral surface of the inflator 20. The gas injected from the gas injecting portion 20a of the inflator 20 into the distal end portion of the sleeve 40 at least partially passes through the gas discharging port 52 of the narrow portion 40a (the gas flow is shown by a reference numeral 54 in the drawing) and is supplied to the first chamber 28A. The remaining gas at least partially passes through the gas passage 50 between the inflator 20 and the sleeve 40 (the gas flow is shown by a reference numeral 53 in the drawing) and is supplied from the opening 50a at the rear end of the gas passage 50 to the second chamber 28B.

The distribution and supply of gas by the sleeve 40 to the first bag portion 16A (the first chamber 28A) and the second bag portion 16B (the second chamber 28B) is controlled to be a ratio of flow rates such that the pressure in the first bag portion 16A is higher than the pressure in the second bag portion 16B. The pressures in the first bag portion 16A and the second bag portion 16B become desired values by setting the diameter of the gas discharging port 52 of the narrow portion 40a to a predetermined calculated value.

The diffuser cloth 64 introduces the gas from the inflator 20 that is discharged from the gas discharging port 52 of the sleeve 40 and into the first bag portion 16A (the first chamber 28A). The gas is restrained from flowing in a reverse direction from the first bag portion 16A to the second bag portion 16B. The diffuser cloth 64 is formed of a circular cylindrical base cloth having an outer diameter slightly larger than the outer diameter of the sleeve 40 and projects forward from the distal end of the sleeve 40. The mounting portion 64a is formed into a tongue-shape and located at the rear end of the fitting portion which is fitted to the sleeve 40 of the diffuser cloth 64.

The heat cloth 56 protects the first bag portion 16A from a high temperature of the gas flowing into the first chamber 28A and restrains the gas from flowing in a reverse direction from the first bag portion 16A to the second bag portion 16B. The heat cloth 56 is formed of an irregular circular cylindrical base cloth having a large diameter portion extending to the front of the distal end of the diffuser cloth 64. The large diameter portion of the heat cloth 56 is provided into a shape deviated from the sleeve 40 and includes the diffuser cloth 64. A portion extending at a right angle with respect to the direction of injection of the gas from the inflator to the first bag portion 16A has a size that allows the portion to reach a vertical linear boundary 24a1 between the first bag portion 16A and the second bag portion 16B formed by the inner seam 24a. The mounting portion 56a is formed into a tongue-shape and located at the rear end of the fitting portion that is fitted to the sleeve 40 of the heat cloth 56.

FIG. 4(a) is a perspective view showing behaviors of the diffuser cloth and the heat cloth in the course of expansion and deployment of the side-collision airbag. In the course of expansion and deployment of the side-collision airbag 16, the diffuser cloth 64 and the heat cloth 56 are extended to an extremity of the front of the sleeve 40 by the gas injected from the inflator 20 via the gas discharging port 52. The gas injected from the gas discharging port 52 at the distal end of the sleeve 40 passes through the interior of the diffuser cloth 64 and flows from an opening 66 at the distal end to the interior of the heat cloth 56. The gas then passes through the interior of the heat cloth 56 and an opening 58 at the distal end and is supplied into the first chamber 28A as shown by arrows 62 in the drawing. By introducing the high-temperature gas injected from the inflator 20 into the first bag portion 16A using the diffuser cloth 64 and the heat cloth 56, the high-temperature gas is prevented from being injected from the gas discharging port 52 of the narrow portion 40a of the sleeve 40 directly to the first and second panels 22A, 22B or the seam located around the panels and deterioration of the base cloths or the seam of the first bag portion 16A due to the high-temperature gas is reduced.

FIG. 4(b) is a perspective view showing behaviors of the diffuse cloth and the heat cloth when the side-collision airbag is nearly expanded and deployed. Because the side-collision airbag has a plurality of portions that restrain the chest part and the lumbar part of the occupant 12, the pressure that controls the lumbar part is generally set to a higher pressure than that of the portion on the side of the chest part in order to improve restraint. The inner pressure of a portion that controls the lumbar part may be maintained, and hence it may be preferable to prevent the gas from flowing in a reverse direction from the portion on the side of the lumbar part to the portion on the side of the chest part after the airbag has expanded and deployed. The diffuser cloth 64 and the heat cloth 56 are pressed by the gas against the narrow portion 40a of the sleeve 40 after the side-collision airbag 16 has expanded and deployed as shown in FIG. 4(b) so that the gas discharging port 52 is closed. Accordingly, a reverse flow of the gas from the first bag portion 16A to the second bag portion 16B is restrained and the pressure in the first bag portion 16A can be maintained at a high pressure for a long period of time.

The gas distributing member of the inflator 20 is configured by providing the cylindrical sleeve 40 on the inflator 20 to form the gas discharging port 52 opening into the first bag portion 16A at the distal end of the sleeve 40. The sleeve 40 is fitted to the inflator 20 with a gap formed between them to define the gas passage 50 opening into the second bag portion 16B between the sleeve and the inflator 20. The gas injected from the inflator 20 is distributed and supplied to the first bag portion 16A and the second bag portion 16B while adjusting the flow rate of the gas by adjusting the cross-sectional area of the gas discharging port 52 (and/or the gas passage 50) so the flow rate becomes higher in the first bag portion 16A. Because the gas injected from the inflator 20 is distributed and supplied to the second bag portion 16B, the side-collision airbag 16 expands and deploys without retarding expansion and deployment of the second bag portion 16B.

The gas from the inflator 20 is introduced to the first bag portion 16A with the diffuser cloth 64 to prevent the gas from flowing in a reverse direction from the first bag portion 16A to the second bag portion 16B and so that the pressure in the interior of the first bag portion 16A may be maintained at a high pressure for a long period of time.

Use of the heat cloth 56 results in reduced deterioration of the base cloth and the seam of the first bag portion 16A due to the high-temperature gas and the gas is prevented from flowing in a reverse direction from the first bag portion 16A to the second bag portion 16B so the pressure in the interior of the first bag portion 16A is maintained at a high pressure for a long period of time.

To further improve occupant restraint of the side-collision airbag 16, the pressure of the entire airbag 16 may be adjusted by moving the gas in the interior of the first bag portion 16A to the second bag portion 16B after the pressure in the first bag portion 16A has been sufficiently increased. Alternatively, the gas may be quickly released from the first bag portion 16A to the second bag portion 16B to reduce the pressure in the first bag portion 16A when a lower portion of the side wall of the vehicle body is deformed by an impact due to the collision of the vehicle or the occupant compresses the first bag portion 16A and hence the pressure in the first bag portion 16A is excessively increased.

A communicating portion 80 communicates or transfers the gas between the first bag portion 16A and the second bag portion 16B. More specifically, the communicating portion 80 is formed on the linear boundary 24a1 with an unseamed portion on a part of the vertical linear boundary 24a1 where the first bag portion 16A and the second bag portion 16B come into contact with each other in the lateral direction (fore-and-aft direction of the vehicle). Preferably, the vertical length of the communicating portion 80 is between about 10 mm and 20 mm.

The communicating portion 80 is configured so as to be almost closed by the heat cloth 56 in the initial stage of the expansion and deployment of the side-collision airbag 16. Accordingly, the gas is prevented from releasing from the communicating portion 80 in the initial stage of the expansion and deployment and the first bag portion 16A can be quickly and efficiently filled.

A peripheral seamed portion 24a2 of the seam 24a facing the communicating portion 80 is preferably seamed into a curved shape projecting toward the second bag portion 16B. Accordingly, stress is not concentrated to the peripheral seamed portion 24a2 around the communicating portion 80 at the expansion of the first bag portion 16A and the end of the seam of the peripheral seamed portion 24a2 is prevented from coming apart.

Because the communicating portion 80 is provided at the vertical linear boundary 24a1 between the first bag portion 16A and the second bag portion 16B, the communicating portion 80 is configured to be almost closed by the heat cloth 56 at the initial stage of the expansion and deployment of the side-collision airbag 16 so that the gas is sufficiently accumulated in the first bag portion 16A. When the pressure in the first bag portion 16A is sufficiently increased or is increased excessively, an adequate amount of gas can be released from the first bag portion 16A through the communicating portion 80 to the second bag portion 16B to improve the impact energy absorption of the side-collision airbag 16.

Figure 5:
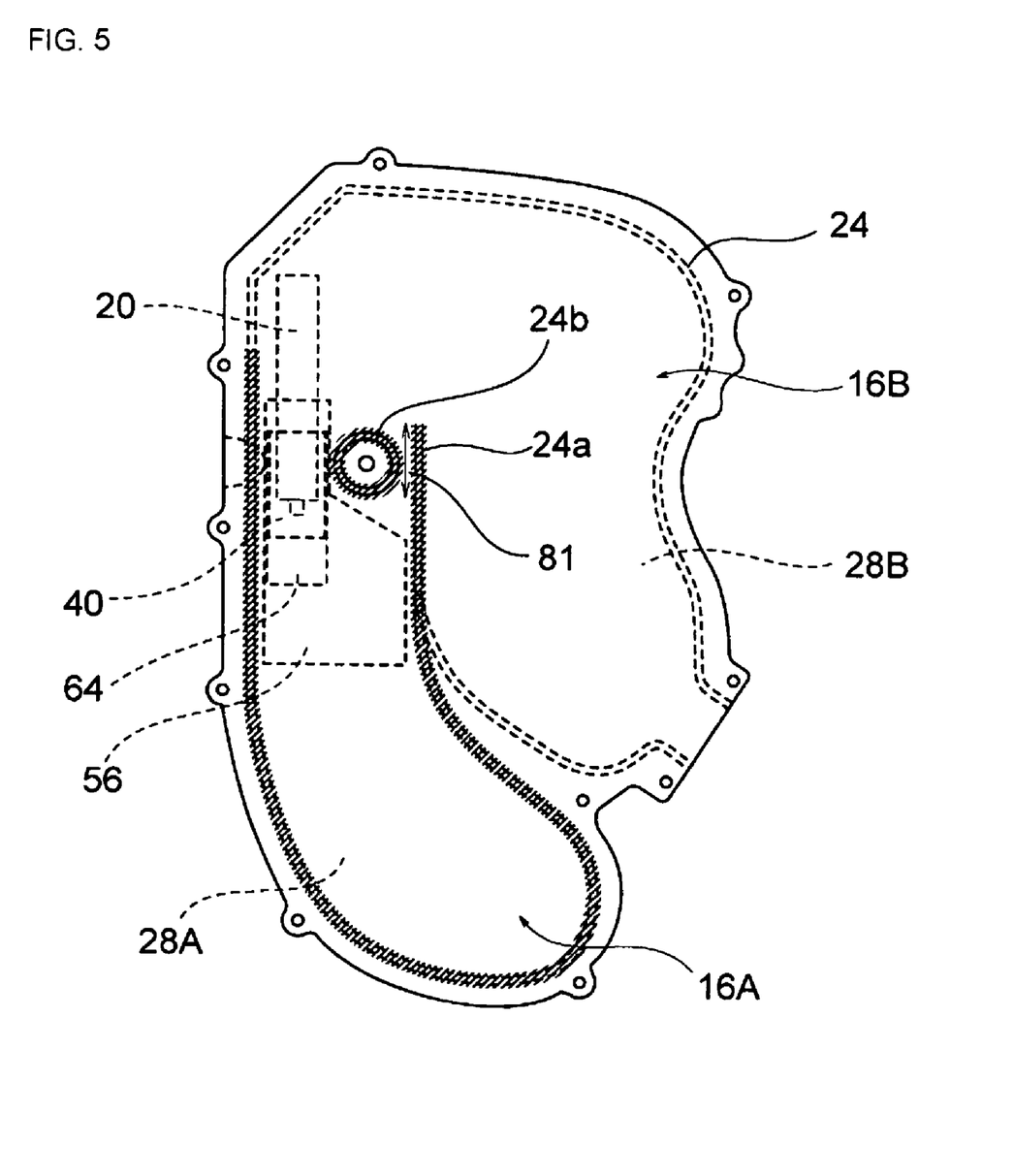
FIG. 5 is a front view of an expanded and deployed airbag of the side-collision airbag apparatus according to another exemplary embodiment.

According to another exemplary embodiment as shown in FIG. 5, the airbag includes an unseamed portion on a portion of the boundary between the first bag portion 16A and the second bag portion 16B formed by the inner seam 24a (which is nearer than the circular seam (non-expanding portion) 24b). The unseamed portion is on a lateral linear boundary of the circular seam 24b at a position nearer the front of the vehicle where the first bag portion 16A and the second bag portion 16B come into contact with each other in the vertical direction. The airbag also includes a communicating portion 81 which communicates the first bag portion 16A and the second bag portion 16B is formed on the boundary. The communicating portion 81 formed at such a position may be configured to almost be closed by the heat cloth 56 in the initial stage of the expansion and deployment of the side-collision airbag 16. Preferably, the length of the communicating portion 81 in the fore-and-aft direction is between about 10 mm and 20 mm.

The communicating portion 81 is configured to be almost closed by the heat cloth 56 in the initial stage of the expansion and deployment of the side-collision airbag 16 so that the gas is sufficiently accumulated in the first bag portion 16A. When the pressure in the first bag portion 16A is sufficiently increased and is further increased excessively, an adequate amount of gas can be released from the first bag portion 16A through the communicating portion 81 to the second bag portion 16B to improve the impact energy absorption of the side-collision airbag 16.

Figure 6:
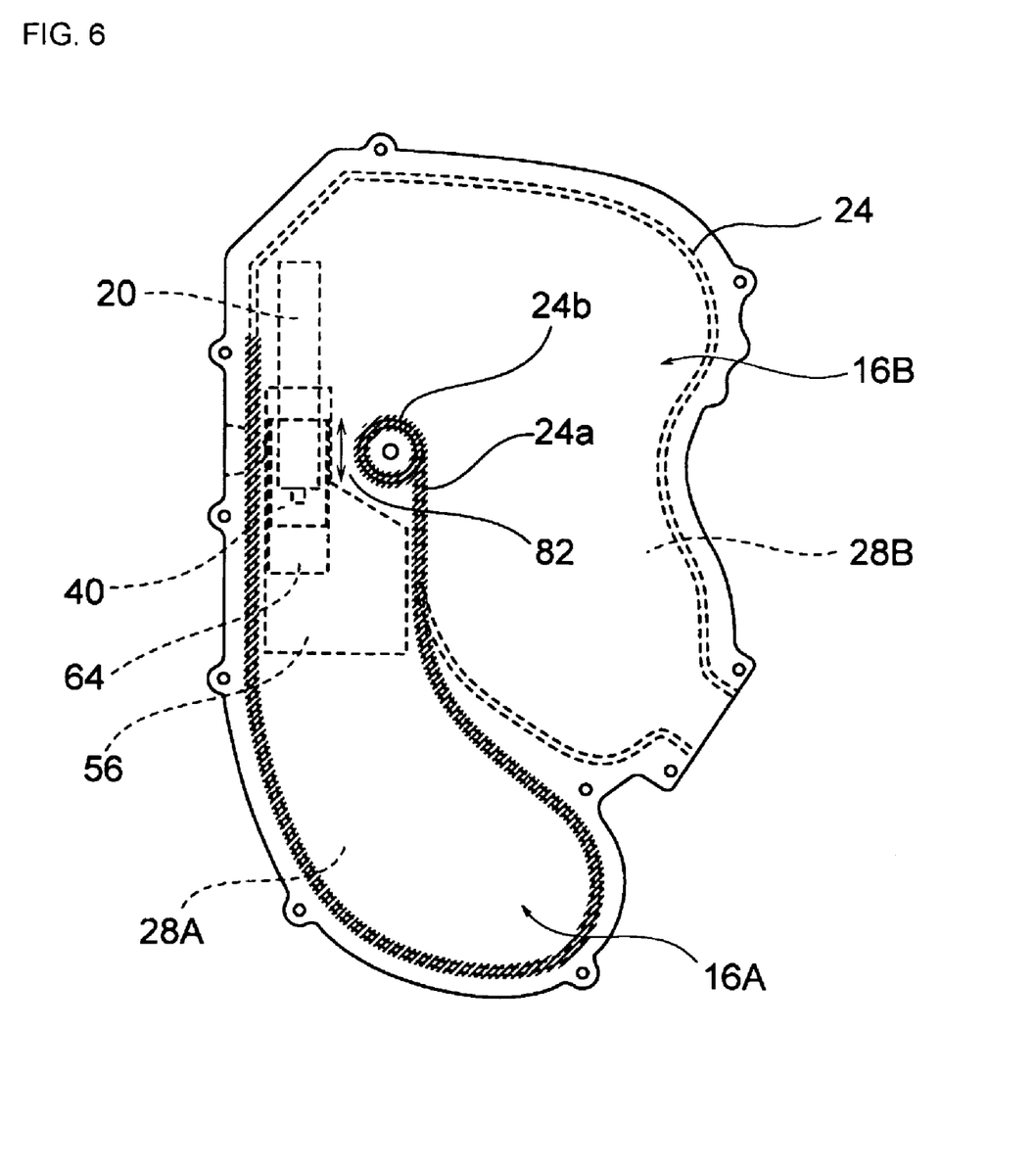
FIG. 6 is a front view of an expanded and deployed airbag of the side-collision airbag apparatus according to still another exemplary embodiment.

According to another exemplary embodiment, the airbag may include the circular seam (non-expanding portion) 24b at a position nearer the front of the vehicle so as to be apart from the sleeve 40 of the inflator 20 as shown in FIG. 6. A communicating portion 82 that communicates or transfers the gas between the first bag portion 16A and the second bag portion 16B is formed between the sleeve 40 and the circular seam 24b. The communicating portion 82 is formed at may be configured to almost be closed by the heat cloth 56 in the initial stage of the expansion and deployment of the side-collision airbag 16. Preferably, the length of the communicating portion 82 in the fore-and-aft direction is between about 10 mm to 20 mm.

The communicating portion 82 is configured to be almost closed by the heat cloth 56 at the initial stage of the expansion and deployment of the side-collision airbag 16 so that the gas is sufficiently accumulated in the first bag portion 16A. When the pressure in the first bag portion 16A is sufficiently increased and is further increased excessively, an adequate amount of gas can be released from the first bag portion 16A through the communicating portion 82 to the second bag portion 16B to improve the impact energy absorption of the side-collision airbag 16.

The priority application, Japanese Patent Application No. 2008-041609, filed Feb. 22, 2008 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A side-collision airbag apparatus, comprising:
an airbag comprising a first bag portion and a second bag portion adjacent to the first bag portion, the first and second bag portions being formed by connecting two base cloths coated with silicon, the second bag portion having a vent hole, the airbag being stored in a folded state in an interior of a seatback portion of a vehicle seat, the airbag being configured to be deployed to a side of an occupant on the seat by a supply of gas, the deployed airbag receiving a lumbar part of the occupant at the first bag portion and receiving a chest part of the occupant at the second bag portion;
a cylindrical inflator extending across the first bag portion and the second bag portion at a position between the airbag and a rear of the vehicle, the inflator including a gas injecting portion located in the first bag portion at a distal end of the inflator;
a cylindrical gas distributing member having a circumferential surface, an end surface at a distal end of the gas distributing member that projects inward from the circumferential surface, a gas discharge port that opens into the first bag portion and is disposed on the end surface, and a gas passage that opens into the second bag portion and is formed between the gas distributing member and a peripheral surface of the inflator, the gas distributing member being fitted to the peripheral surface and configured to distribute and supply the gas injected from the inflator to the first bag portion and the second bag portion so the flow rate of the gas is higher in the first bag portion than in the second bag portion; and
a communicating portion for communicating gas between the first bag portion and the second bag portion.

2. The side-collision airbag apparatus according to claim 1, further comprising a boundary between the first bag portion and the second bag portion that is formed by seaming and includes a linear boundary extending in a vertical direction, wherein the communicating portion is formed at the linear boundary by providing an unseamed portion at a portion of the linear boundary.

3. The side-collision airbag apparatus according to claim 2, wherein the gas distributing member includes a heat cloth having an irregular cylinder shape, wherein a portion of the heat cloth extends at a right angle with respect to a direction the gas injected from the inflator to the first bag portion and reaches the linear boundary.

4. The side-collision airbag apparatus according to claim 1, further comprising a non-expanding portion that is formed on the gas distributing member at a position nearer a front of the vehicle, the non-expanding portion being formed by seaming a periphery so that the communication between the first bag portion and the second bag portion is blocked, wherein the communicating portion is formed at the non-expanding portion at a side nearer the front of the vehicle by providing an unseamed portion at the non-expanding portion of a boundary formed by seaming the first bag portion and the second bag portion at the position nearer the front of the vehicle.

5. The side-collision airbag apparatus according to claim 1, further comprising a non-expanding portion that is formed on the gas distributing member at a position nearer a front of the vehicle by seaming a periphery of the non-expanding portion so the communication between the first bag portion and the second bag portion is blocked, wherein the communicating portion is formed between the non-expanding portion and the gas distributing member by providing the non-expanding portion at a position apart from the gas distributing member and nearer the front of the vehicle.

6. The side-collision airbag apparatus according to claim 1, wherein the cylindrical gas distributing member is disposed between apexes of opposing seams connecting the two base cloths.

7. The side-collision airbag apparatus according to claim 6, wherein one of the apexes is positioned within an internal side of a seal member that seals a side of the two connected base cloths.

8. The side-collision airbag apparatus according to claim 1, wherein a seal member that seals a side of the two connected base cloths runs along an entire longitudinal length of the cylindrical gas distributing member on a first side of the cylindrical gas distributing member.

9. The side-collision airbag apparatus according to claim 8, wherein a seam runs along a portion of the longitudinal length of the cylindrical gas distributing member on a second side of the cylindrical gas distributing member.

10. A side-collision airbag apparatus, comprising:
an airbag comprising a first bag portion and a second bag portion adjacent to the first bag portion, the first and second bag portions being formed by connecting two base cloths, the airbag being stored in a folded state in an interior of a seatback portion of a vehicle seat, the airbag being configured to be deployed to a side of an occupant on the seat by a supply of gas, the deployed airbag receiving a lumbar part of the occupant at the first bag portion and receiving a chest part of the occupant at the second bag portion;
a cylindrical inflator extending across the first bag portion and the second bag portion at a position between the airbag and a rear of the vehicle, the inflator including a gas injecting portion located in the first bag portion at a distal end of the inflator;
a cylindrical gas distributing member having a gas discharge port that opens into the first bag portion at a distal end of the gas distributing member and a gas passage that opens into the second bag portion and is formed between the gas distributing member and a peripheral surface of the inflator, the gas distributing member being fitted to the peripheral surface and configured to distribute and supply the gas injected from the inflator to the first bag portion and the second bag portion so the flow rate of the gas is higher in the first bag portion than in the second bag portion;

a communicating portion for communicating gas between the first bag portion and the second bag portion; and a heat cloth configured to nearly close off the communication portion in an initial stage of deployment of the airbag.

11. The side-collision airbag apparatus according to claim 10, wherein the heat cloth has an irregular cylinder shape, wherein a portion of the heat cloth extends at a right angle with respect to a direction the gas injected from the inflator to the first bag portion and reaches a linear boundary extending in a vertical direction.

12. The side-collision airbag apparatus according to claim 10, wherein the heat cloth reduces an amount of deterioration of the first bag portion caused by the gas injected from the inflator.

13. The side-collision airbag apparatus according to claim 10, wherein the heat cloth is configured to nearly close off the communication portion in the initial stage of deployment such that gas is prevented from flowing through the communicating portion in the initial stage of deployment.

14. The side-collision airbag apparatus according to claim 10, wherein the heat cloth is configured to release gas from the first bag portion to the second bag portion through the communicating portion when a sufficient pressure is achieved in the first bag portion.

15. The side-collision airbag apparatus according to claim 10, wherein the heat cloth is configured to release gas from the first bag portion to the second bag portion through the communicating portion when a predetermined pressure is achieved in the first bag portion.

16. The side-collision airbag apparatus according to claim 10, further comprising a boundary between the first bag portion and the second bag portion that is formed by seaming and includes a linear boundary extending in a vertical direction, wherein the communicating portion is formed at the linear boundary by providing an unseamed portion at a portion of the linear boundary.

17. The side-collision airbag apparatus according to claim 10, further comprising a non-expanding portion that is formed on the gas distributing member at a position nearer a front of the vehicle, the non-expanding portion being formed by seaming a periphery so that the communication between the first bag portion and the second bag portion is blocked, wherein the communicating portion is formed at the non-expanding portion at a side nearer the front of the vehicle by providing an unseamed portion at the non-expanding portion of a boundary formed by seaming the first bag portion and the second bag portion at the position nearer the front of the vehicle.

18. The side-collision airbag apparatus according to claim 10, further comprising a non-expanding portion that is formed on the gas distributing member at a position nearer a front of the vehicle by seaming a periphery of the non-expanding portion so the communication between the first bag portion and the second bag portion is blocked, wherein the communicating portion is formed between the non-expanding portion and the gas distributing member by providing the non-expanding portion at a position apart from the gas distributing member and nearer the front of the vehicle.

* * * * *